United States Patent
Bates

(10) Patent No.: US 7,344,201 B1
(45) Date of Patent: Mar. 18, 2008

(54) VEHICLE AIR BRAKING SYSTEMS

(75) Inventor: Ian Richard Joseph Bates, West Yorkshire (GB)

(73) Assignee: WABCO Automotive UK Limited, Leeds (GB)

(*) Notice: Subject to any disclaimer, the term of this patent is extended or adjusted under 35 U.S.C. 154(b) by 503 days.

(21) Appl. No.: 09/980,083

(22) PCT Filed: Jun. 2, 2000

(86) PCT No.: PCT/GB00/02125

§ 371 (c)(1),
(2), (4) Date: Mar. 1, 2002

(87) PCT Pub. No.: WO00/74990

PCT Pub. Date: Dec. 14, 2000

(30) Foreign Application Priority Data

Jun. 2, 1999 (GB) ................................ 9912681.5

(51) Int. Cl.
*B60T 15/00* (2006.01)
(52) U.S. Cl. .......................................... 303/57; 303/11
(58) Field of Classification Search ................. 303/11, 303/57; 417/279, 292, 282
See application file for complete search history.

(56) References Cited

U.S. PATENT DOCUMENTS

| | | | |
|---|---|---|---|
| 4,361,204 A | | 11/1982 | Earle |
| 4,459,085 A | * | 7/1984 | Tonegawa .................... 417/282 |
| 5,894,881 A | | 4/1999 | Wagner et al. |
| 5,951,260 A | * | 9/1999 | Cramer et al. ............... 417/282 |
| 6,036,449 A | | 3/2000 | Nishar et al. |
| 6,089,831 A | * | 7/2000 | Bruehmann et al. ......... 417/282 |
| 6,120,107 A | * | 9/2000 | Eslinger ........................ 303/1 |

FOREIGN PATENT DOCUMENTS

| | | |
|---|---|---|
| DE | 35 25 107 A1 | 2/1986 |
| DE | 195 15 895 A1 | 10/1996 |
| DE | 196 27 403 A1 | 1/1998 |
| DE | 197 14 513 A1 | 10/1998 |
| EP | 0 119 505 A1 | 9/1984 |
| EP | 0 335 086 A1 | 10/1989 |
| EP | 0 558 005 A2 | 9/1993 |
| GB | 2 049 823 A | 12/1980 |
| WO | WO 97/11274 | 3/1997 |
| WO | WO 98/07588 | 2/1998 |
| WO | WO 98/17493 * | 4/1998 |
| WO | WO 98/57730 | 12/1998 |

OTHER PUBLICATIONS

International Search Report (PCT/ISA/210).

* cited by examiner

*Primary Examiner*—Bradley King
(74) *Attorney, Agent, or Firm*—Nixon Peabody LLP; Jeffrey L. Vostellia

(57) ABSTRACT

An electronic control system for the compressor of a vehicle air braking system, the control system having one or more inputs indicative of a vehicle operating state, and an output for determining whether a compressor is on-load or off-load, the system further including target means to calculate in real time a target pressure for a reservoir downstream of said compressor, said output being responsive to said target means. The target pressure may be varied in real time to suit vehicle running conditions and permits a small but significant reduction in vehicle fuel consumption by driving the compressor when the vehicle is likely to be coasting or slowing down.

12 Claims, 1 Drawing Sheet

Vehicle State

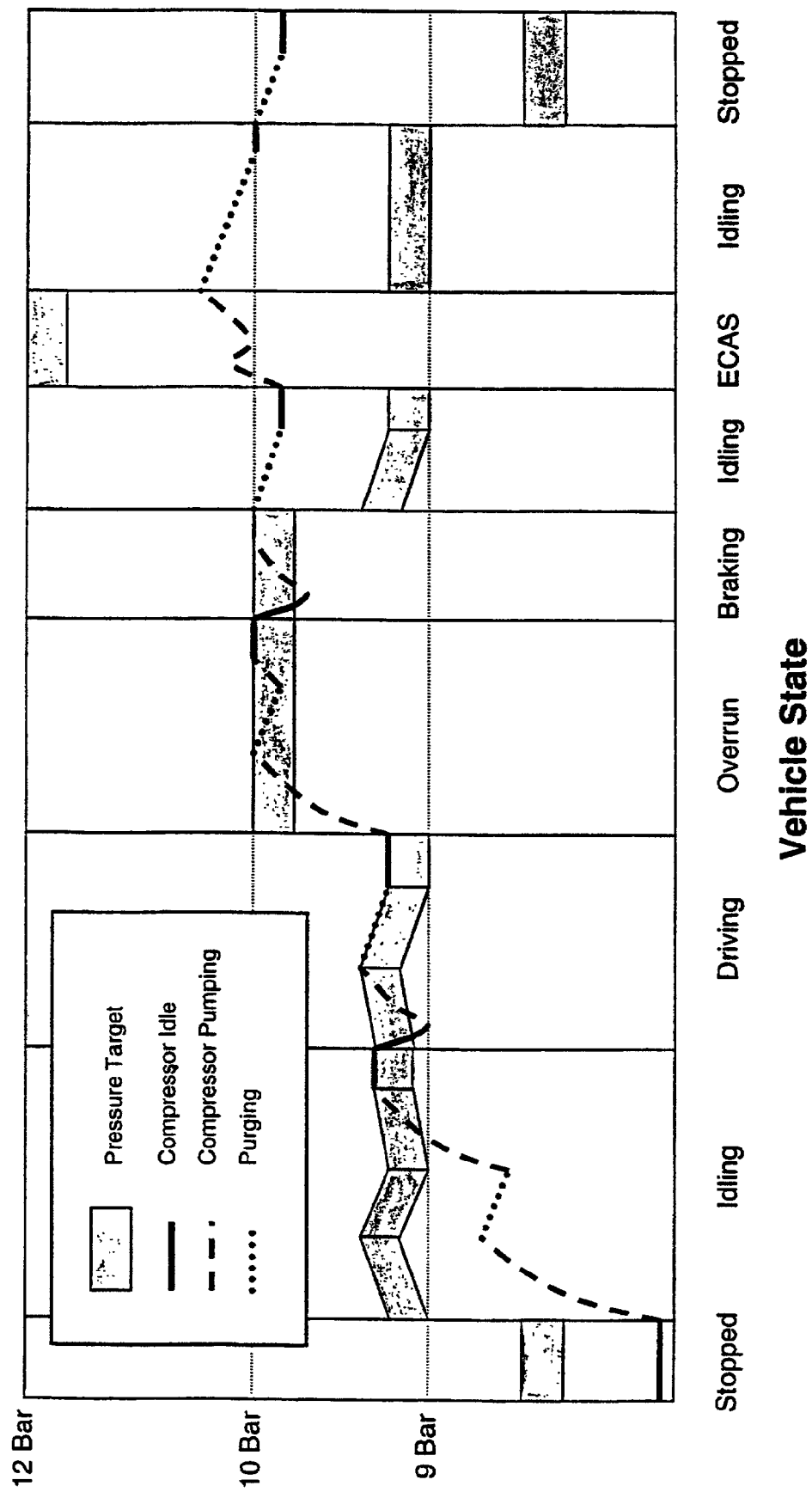

VEHICLE AIR BRAKING SYSTEMS

BACKGROUND OF THE INVENTION

1. Field of the Invention

This invention relates to vehicle air braking systems, and particularly to electronic control of the air compressor for use in such systems.

2. Description of Related Art

A typical air braking system includes a compressor, a reservoir for pressurised air, a driver operated demand valve, and a plurality of air actuators for the vehicle wheel brakes. The system usually includes a dryer for compressor outlet air, and control means to take the compressor off load when the reservoir is at maximum pressure and the demand valve is closed. A compressor is typically taken off load by connecting the output temporarily to atmosphere, so that the compressor free wheels. Alternatively the compressor may include a clutch engageable with its drive source, usually the vehicle engine.

Compressors absorb significant energy, and accordingly it is desirable to minimise on-time whilst ensuring that a sufficient volume of pressurised air is available to meet demand. This is conventionally done in part by minimising the 'dead' volume on the high pressure side of the demand valve.

Compressor control systems exist whereby the control of the compressor is responsive to one or more sensed vehicle operating conditions. These control systems operate between pre-set upper and lower braking system pneumatic pressures.

What is required is a control system which can better determine compressor on-time according to anticipated demand and the vehicle running state in real time.

SUMMARY OF THE INVENTION

According to a first aspect there is provided an electronic control system for the compressor of a vehicle air braking system, the control system having one or more inputs indicative of a vehicle operating state, and an output for determining whether a compressor is on-load or off-load, the system further including target means to calculate in real time a target pressure for a reservoir downstream of said compressor, said output being responsive to said target means.

The advantage of this invention is that the target pressure may be varied in real time to suit vehicle running conditions. For example the target pressure may be higher during throttle-off modes than during throttle-on modes. The target pressure may be directly dependent on anticipated demand of the vehicle braking system, or may be indirectly related to an associated factor such as the temperature of air delivered from the compressor.

Control system inputs may comprise one or more of the following variables; engine speed, vehicle speed, vehicle throttle opening, air pressure in a reservoir of the braking system, air temperature at the outlet of the air compressor, dryness of the desiccant of an air dryer downstream of the compressor relative humidity of ambient air, dryness of air downstream of the air dryer, etc.

In a preferred embodiment the control system comprises a first input for indicating vehicle engine speed, a second input for indicating vehicle speed, a third input for indicating vehicle throttle opening, and a fourth input for indicating air pressure in a reservoir downstream of the compressor, the target pressure being higher during throttle-off modes than during throttle-on modes.

In this specification the term 'throttle' is used in relation to the vehicle accelerator pedal or other means used to control admission of fuel to the vehicle engine.

Such a system requires a higher target pressure in throttle-off modes when the vehicle is likely to be coasting or slowing down. In such circumstances the fuel supply is normally closed off by the driver releasing the accelerator pedal and accordingly vehicle momentum drives the engine and thus the compressor. The energy to drive the compressor in this mode is 'free', at least to the extent that fuel is not being burnt. Additional slowing of the vehicle occurs as a result of the compressor being on-load, but this may be useful where the throttle-off mode is accompanied by or followed by a braking event. In order to take maximum advantage during the throttle-off mode, the target pressure in the air reservoir can be raised above the normal level, and as a result compressor on-time during throttle-on modes can be reduced.

The invention permits a small but significant, reduction in vehicle fuel consumption, and requires only minor adaptation of existing electronic control systems.

In a preferred embodiment the higher target pressure exceeds the normal target pressure by 8-10%. The system may include a third yet higher target pressure to meet high pressure requirements of associated air systems such as air suspension.

A particular advantage of the invention is that the higher target pressure exists during a braking (throttle-off) mode, and where this is the final braking event before the engine is stopped, the reservoir has an extra air charge to give a final purge of the usual air dryer. This is especially useful since the air braking system is left in a dry and clean state at the end of the working day. Also, the vehicle air system is clean and dry at the beginning of the next working day.

Preferably independent control of compressor and purge valve is provided. This ensures that the air line connecting the compressor and purge valve/reservoir is not exhausted each time the purge valve is actuated. Clearly if this air line is exhausted, as has hitherto been the case, the compressor is required to operate for a greater time when brought on load.

Conversely, the normal target pressure may be reduced. For example, if the output from the compressor is very hot, due for instance to hot ambient conditions and significant air demand (and hence significant compressor on-time), the compressed air may approach the temperature at which desiccant in the usual air dryer may be damaged. In such circumstances it may be desirable to reduce the normal target pressure, thereby reducing compressor on-time and permitting the compressor to cool down.

The control system preferably includes an override to ensure that lower target pressures are not imposed during conditions when maximum air volume is required, for example during an emergency braking event.

According to a second aspect there is provided a control system for the compressor of a vehicle air braking system, the compressor being capable of being taken offload at a predetermined target pressure, wherein the control system has an input indicative of vehicle throttle position and is adapted to increase said target pressure in real time at a zero throttle opening.

According to a third aspect there is provided a control system for the compressor of a vehicle air braking system, the control system having a first input for indicating vehicle engine speed, a second input or indicating vehicle speed, a third input for indicating vehicle throttle opening, a fourth input for indicating air pressure in a reservoir downstream of the compressor, and an output for determining whether the compressor is on-load or off-load, the system further including means to calculate in real time a target pressure for said reservoir, the target pressure being higher during throttle-off modes than throttle-on modes.

According to a fourth aspect there is provided a method of controlling a compressor of a vehicle air braking system, the method comprising the steps of:

providing a control system for the compressor having one or more inputs indicative of a vehicles operating state, providing an output from the control system to place the compressor either on-load or off-load depending upon said vehicle operating state, providing target means to calculate a target pressure for a reservoir downstream of said compressor, wherein said output from the control system is responsive to said target means.

In a preferred embodiment said inputs comprise a first input for indicating vehicle engine speed, a second input for indicating vehicle speed, a third input for indicating vehicle throttle opening, and a fourth input for indicating air pressure in the reservoir.

Other aspects of the invention will be apparent from the following description of a preferred embodiment shown by way of example only in the accompanying drawing which illustrates typical target pressures for a compressor in relation to vehicle operating modes.

BRIEF DESCRIPTION OF THE DRAWINGS

The FIGURE illustrates target pressure for a compressor in relation to vehicle operating modes in accordance with one embodiment of the present invention.

DETAILED DESCRIPTION OF THE PREFERRED EMBODIMENT

In the drawing, the X axis indicates vehicle operating modes, whereas the Y axis indicates pressure. The target pressure is indicated by the narrow solid band. As shown on the drawing, a compressor idle state is indicated by a solid line, a dotted line indicates purging, and a dashed line indicates compressor pumping.

In a typical air braking system, the compressor output is directed via a non-return valve and air dryer to a reservoir. Periodically dry air from the reservoir is directed back through the air dryer (which typically includes a bed of desiccant material) in order to purge the majority of moisture therefrom. Purging may be controlled for example by a timer, and occurs after the compressor has been on-load for a predetermined period. Purging does not usually occur during the vehicle braking mode since the system permits air demand to override air quality; however braking events are usually short.

With reference to the drawing, the vehicle is shown first in the stopped mode; the engine is not running. Residual system pressure is low and the compressor is idle (in fact stopped). A target pressure is illustrated, but the value is not important.

Next the engine is started, and is idling. The pressure target is immediately set at the normal level; in this embodiment just above 9 bar. As illustrated, the compressor pumps in two stages with a timed purge in-between; the compressor may pump in more or less stages, is required. Other control systems prevent the vehicle being driven until a safe operating pressure is reached.

On reaching the target the compressor is brought off-load; system pressure may or may not decay, depending on leakage or use of air in systems such as air suspension or windscreen wiper operation.

The pressure target has the usual hysteresis to avoid continual switching of the compressor between a on-load and off-load, and this is indicated by the width of the target pressure band.

During the driving mode the compressor will be brought on load as required, and purging events will also occur as necessary. The pressure target may oscillate slightly as indicated in the idling and driving modes to allow for purging events.

Next, in the overrun mode, the illustrated target pressure is increased to nearly 10 bar. The higher target pressure is set according to system requirements, and may be more or less than 10 bar. In this mode no fuel is used to drive the compressor. Pumping and purging events occur as previously explained. The same occurs in the braking mode, except that purging is avoided.

In the next idling mode the pressure target reduces again to the normal level. The compressor will not come on load again until reservoir pressure drops to the bottom of the normal level band. In this stage a purge cycle after braking is indicated—this is a normal event initiated by the control system to compensate for lack of purging during the braking event itself.

The lower pressure target would also occur in the event of another period in driving mode.

Next is illustrated an ECAS event. This occurs when an associated air system, for example vehicle air suspension requires a high pressure above the normal operating level. The compressor will attempt to reach the new target, but as illustrated, air consumption and supply are rather close and thus only a slight pressure increase is achieved before the ECAS Event is terminated.

Next another idling mode is illustrated, and commenced by a purge cycle due to reduced purging, during the ECAS event.

Finally the vehicle and engine are stopped. The target pressure drops to an unimportant minimum selected by the control software. The high residual pressure permits a final power-down purge to leave the inactive system clean and dry. A residual pressure remains in the system, and this is useful in preventing ingress of uncleaned and undried air.

This description illustrates a range of typical driving events, and is not intended to be exhaustive. The important feature is the higher pressure target during throttle off modes.

The invention claimed is:

1. A control system for the compressor of a vehicle air braking system, the control system having one or more inputs indicative of a vehicle operating state, and an output for determining whether a compressor is on-load or off-load, the system further including target means to calculate in real time, a target pressure band for a reservoir downstream of said compressor, said output being responsive to said target means, wherein the target pressure band moves within at least one of the throttle-off and the throttle-on modes, and is higher during throttle-off modes than throttle-on modes.

2. A control system as claimed in claim 1 wherein a control system input is the vehicle throttle position.

3. A control system according to claim 2 wherein the higher target pressure band exceeds a normal target pressure band by 8-10%.

4. A control system according to claim 3 and further including a third yet higher target pressure band.

5. A control system as claimed in claim 1 wherein a control system input is the temperature at the compressor outlet.

6. A control system as claimed in claim 5 wherein said target pressure band is reduced in response to elevated compressor outlet temperature.

7. A control system according to claim 1 and adapted to provide independent control of said compressor and a purge valve therefor.

8. A control system for the compressor of a vehicle air braking system, the control system calculating a target pressure band in real time, and the compressor being capable of being taken off load at a predetermined target pressure, wherein the control system has an input indicative of vehicle throttle position and is adapted to increase said target pressure band at a zero throttle opening state, and move the target pressure band within the zero throttle opening state.

9. A control system for the compressor of a vehicle air braking system, the control system having a first input for indicating vehicle engine speed, a second input for indicating vehicle speed, a third input for indicating vehicle throttle opening, a fourth input for indicating air pressure in a reservoir downstream of the compressor, and an output for determining whether a compressor is on-load or off-load, the system further including means to calculate a target pressure band for said reservoir in real time, the target pressure band moving within at least one of the throttle-off and the throttle-on modes, and being higher during throttle-off modes than during throttle-on modes.

10. A control system according to claim 9 wherein the higher target pressure band exceeds the normal target pressure band by 8-10%.

11. A control system according to claim 10 and further including a third yet higher target pressure band.

12. A method of controlling a compressor of a vehicle air braking system, the method comprising the steps of:
  providing a control system for the compressor having one or more inputs indicative of a vehicle operating state,
  providing an output from the control system to place the compressor either on-load or off-load depending upon said vehicle operating state,
  providing target means to calculate in real time a target pressure band for a reservoir downstream of said compressor, wherein said output from the control system is responsive to said target means, wherein the target pressure band moves within at least one of the throttle-off and the throttle-on modes, and is higher during throttle-off modes than throttle-on modes.

* * * * *